United States Patent
Takai et al.

(10) Patent No.: US 11,342,587 B2
(45) Date of Patent: May 24, 2022

(54) ADDITIVE FOR NON-AQUEOUS ELECTROLYTIC SOLUTIONS, NON-AQUEOUS ELECTROLYTIC SOLUTION, AND ELECTRICAL STORAGE DEVICE

(71) Applicant: Sumitomo Seika Chemicals Co., Ltd., Hyogo (JP)

(72) Inventors: Yasuyuki Takai, Hyogo (JP); Yuki Kono, Hyogo (JP); Noriko Yamamoto, Hyogo (JP); Koji Fujita, Hyogo (JP)

(73) Assignee: SUMITOMO SEIKA CHEMICALS CO., LTD., Hyogo (JP)

(*) Notice: Subject to any disclaimer, the term of this patent is extended or adjusted under 35 U.S.C. 154(b) by 0 days.

(21) Appl. No.: 16/491,513

(22) PCT Filed: Mar. 6, 2018

(86) PCT No.: PCT/JP2018/008622
§ 371 (c)(1),
(2) Date: Sep. 5, 2019

(87) PCT Pub. No.: WO2018/164138
PCT Pub. Date: Sep. 13, 2018

(65) Prior Publication Data
US 2020/0036040 A1 Jan. 30, 2020

(30) Foreign Application Priority Data
Mar. 8, 2017 (JP) ............................. JP2017-044271

(51) Int. Cl.
H01M 10/0567 (2010.01)
H01G 11/50 (2013.01)
(Continued)

(52) U.S. Cl.
CPC ........ H01M 10/0567 (2013.01); H01G 11/50 (2013.01); H01G 11/64 (2013.01);
(Continued)

(58) Field of Classification Search
CPC ........ H01G 11/06; H01G 11/50; H01G 11/64; H01M 10/0525; H01M 2300/0025;
(Continued)

(56) References Cited

U.S. PATENT DOCUMENTS

| 2,810,728 A | 10/1957 | Beesley | |
| 2006/0286459 A1* | 12/2006 | Zhao | H01M 10/0567 429/326 |

(Continued)

FOREIGN PATENT DOCUMENTS

| CN | 102017270 | 4/2011 |
| CN | 104521056 | 4/2015 |

(Continued)

OTHER PUBLICATIONS

English machine translation of "Sulfone Compounds and Nonaqueous Electrolyte Using the Same" by Fukuda Noriaki et al. in JP2012056925 (A) (Year: 2012).*

(Continued)

*Primary Examiner* — Jonathan G Jelsma
*Assistant Examiner* — Omar M Kekia
(74) *Attorney, Agent, or Firm* — Hamre, Schumann, Mueller & Larson, P.C.

(57) ABSTRACT

Disclosed is an additive for nonaqueous electrolyte solutions, including a first compound represented by the formula (1), and at least one second compound selected from the group consisting of an ethylene carbonate compound, a vinyl ethylene carbonate compound, a cyclic sulfonic acid ester compound, and a cyclic disulfonic acid ester compound, (Continued)

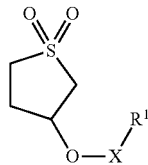

(1)

in the formula (1), X represents a sulfonyl group or a carbonyl group, and $R^1$ represents an alkyl group having 1 to 4 carbon atoms and optionally substituted with a halogen atom or the like.

9 Claims, 1 Drawing Sheet

(51) Int. Cl.
  *H01G 11/64* (2013.01)
  *H01M 4/485* (2010.01)
  *H01M 4/525* (2010.01)
  *H01M 10/0525* (2010.01)
  *H01G 11/06* (2013.01)

(52) U.S. Cl.
  CPC .......... *H01M 4/485* (2013.01); *H01M 4/525* (2013.01); *H01M 10/0525* (2013.01); *H01G 11/06* (2013.01); *H01M 2220/20* (2013.01); *H01M 2300/0025* (2013.01); *Y02E 60/10* (2013.01)

(58) Field of Classification Search
  CPC ............ H01M 4/525; H01M 10/0567; H01M 2220/20; H01M 4/485; Y02E 60/10
  USPC ........................................................ 429/200
  See application file for complete search history.

(56) References Cited

U.S. PATENT DOCUMENTS

| | | | |
|---|---|---|---|
| 2008/0074753 A1 | 3/2008 | Abe | |
| 2009/0011367 A1 | 1/2009 | Omatsu et al. | |
| 2013/0040209 A1* | 2/2013 | Mio | H01M 10/0567 429/336 |
| 2015/0221985 A1 | 8/2015 | Abe | |
| 2016/0004157 A1 | 1/2016 | Ito et al. | |
| 2016/0028123 A1* | 1/2016 | Kawasaki | H01M 4/364 429/336 |

FOREIGN PATENT DOCUMENTS

| | | | |
|---|---|---|---|
| CN | 104956536 | 9/2015 | |
| CN | 106099191 | 11/2016 | |
| CN | 108028427 | 5/2018 | |
| EP | 2858164 | 4/2015 | |
| JP | 63-102173 | 5/1988 | |
| JP | 5-074486 | 3/1993 | |
| JP | 11-180974 | 7/1999 | |
| JP | 2001-052738 | 2/2001 | |
| JP | 2002-352852 | 12/2002 | |
| JP | 2004-281368 | 10/2004 | |
| JP | 2005-336155 | 12/2005 | |
| JP | 2010-138157 | 6/2010 | |
| JP | 2012056925 A * | 3/2012 | Y02E 60/10 |
| JP | 2012-084384 | 4/2012 | |
| JP | 2015-138597 | 7/2015 | |
| KR | 10-2017-0108589 | 9/2017 | |
| WO | 2013/183655 | 12/2013 | |
| WO | 2014/021272 | 2/2014 | |
| WO | 2017/043576 | 3/2017 | |

OTHER PUBLICATIONS

International Preliminary Report on Patentability issued in PCT/JP2018/008622, dated Sep. 19, 2019, 7 pages.
The extended European Search Report issued for European Patent Application No. 18763718.6, dated Feb. 11, 2021, 7 pages.

* cited by examiner

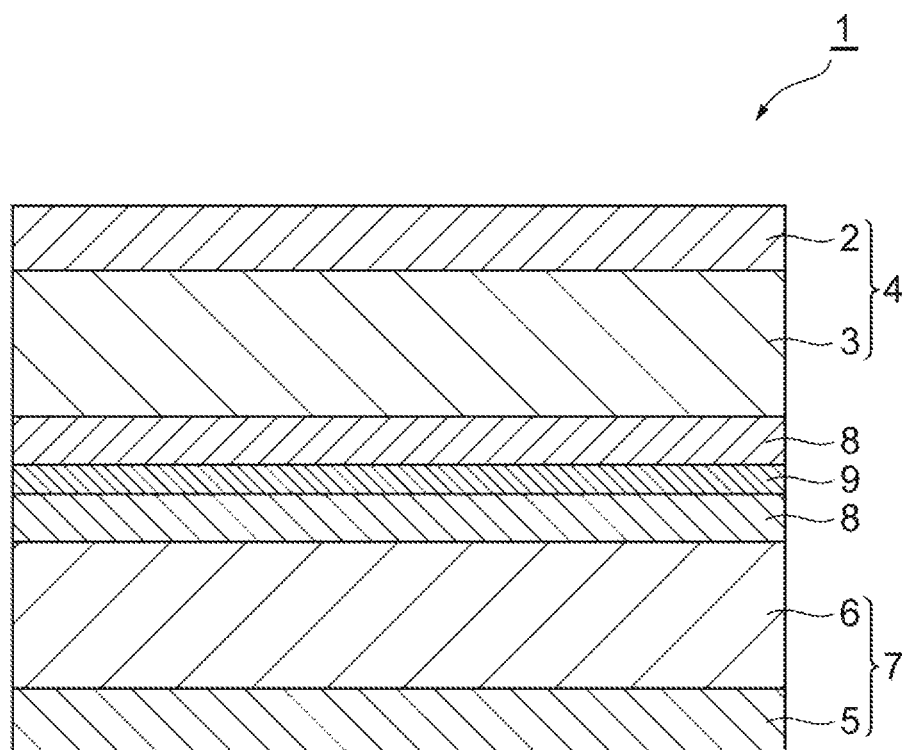

ADDITIVE FOR NON-AQUEOUS ELECTROLYTIC SOLUTIONS, NON-AQUEOUS ELECTROLYTIC SOLUTION, AND ELECTRICAL STORAGE DEVICE

TECHNICAL FIELD

The present invention relates to an additive for nonaqueous electrolyte solutions. The present invention also relates to a nonaqueous electrolyte solution containing the additive for nonaqueous electrolyte solutions and an electricity storage device using the nonaqueous electrolyte solution.

BACKGROUND ART

In recent years, along with an increase in attention to solving environmental problems and establishing a sustainable recycling-based society, nonaqueous electrolyte solution secondary batteries typified by lithium ion batteries and electricity storage devices such as an electric double layer capacitor have been widely studied. The lithium ion batteries are used as power sources for electronic equipment such as laptops, or for electric motives or power storage from the viewpoint that they have high working voltages and energy densities. These lithium ion batteries are increasingly demanded as a battery having a high output and a high energy density with a high capacity from the viewpoint that they have higher energy densities than lead batteries and nickel-cadmium batteries and an increase of the capacity is realized.

In particular, automotive lithium ion batteries have been required to suppress battery swelling due to a long lifespan and deterioration among battery performance required for the lithium ion batteries. That is, it has become a significant task to sufficiently meet suppression of battery swelling by maintaining the capacity of a battery, reducing the resistance of a battery, and suppressing gas generation inside a battery.

As a method for obtaining a battery having a long lifespan, a method in which various additives are added to an electrolyte solution has been studied. The additives are decomposed during a first charge/discharge to form a film called a solid electrolyte interface (SEI) on a surface of an electrode. Since the SEI is formed during the first cycle of the charge/discharge cycles, electricity is suppressed from being consumed for the decomposition of a solvent and the like in the electrolyte solution and the lithium ions can be transferred between electrodes through the SEI. That is, formation of the SEI prevents the deterioration of electricity storage devices such as a nonaqueous electrolyte solution secondary battery in a case where the charge/discharge cycles are repeated, and contributes to an improvement of battery characteristics, storage characteristics, load characteristics, or the like.

As for a compound that forms the SEI, for example, Patent Literature 1 discloses that charge/discharge cycle characteristics of a lithium secondary battery are improved by incorporating 1,3-propanesultone (PS) into an electrolyte solution. Patent Literature 2 discloses that discharge characteristics and the like of a lithium secondary battery are improved by the addition of a derivative of vinylene carbonate (VC) as an additive. Patent Literature 3 discloses that gas generation in a battery is suppressed by incorporating a phosphoric acid ester-based compound into an electrolyte solution. Further, Patent Literatures 4 and 5 disclose that battery performance such as cycle characteristics is improved by adding a cyclic disulfonic acid ester as an additive. In addition, Patent Literature 6 discloses that charge/discharge efficiency, storage characteristics, and cycle characteristics are improved by incorporating a vinylene carbonate compound and/or a vinyl ethylene carbonate compound, and an acid anhydride into an electrolyte solution.

CITATION LIST

Patent Literature

[Patent Literature 1] Japanese Unexamined Patent Publication No. S63-102173

[Patent Literature 2] Japanese Unexamined Patent Publication No. H5-74486

[Patent Literature 3]. Japanese Unexamined Patent Publication No. 2012-84384

[Patent Literature 4] Japanese Unexamined Patent Publication No. 2004-281368

[Patent Literature 5] Japanese Unexamined Patent Publication No. 2015-138597

[Patent Literature 6] Japanese Unexamined Patent Publication No. 2002-352852

SUMMARY OF INVENTION

Technical Problem

However, nonaqueous electrolyte solutions using the additives in the related art were still not sufficient in satisfying both extension of a lifespan and suppression of gas generation.

An object of the present invention is to provide an additive for nonaqueous electrolyte solutions to obtain an electricity storage device having a long lifespan and suppressed gas generation. Another object of the present invention is to provide a nonaqueous electrolyte solution containing the additive for nonaqueous electrolyte solutions and an electricity storage device using the nonaqueous electrolyte solution.

Solution to Problem

As a result of extensive studies to solve the problems, the present inventors have found that it is possible to extend a lifespan and suppress gas generation in an electricity storage device with an additive for nonaqueous electrolyte solutions, including a combination of: a specific cyclic sulfone compound; and at least one compound selected from the group consisting of a specific ethylene carbonate compound, a specific vinyl ethylene carbonate compound, a specific cyclic sulfonic acid ester compound, and a specific cyclic disulfonic acid ester compound, thereby completing the present invention.

The present invention provides an additive for nonaqueous electrolyte solutions, containing a first compound represented by the following formula (1) and at least one second compound selected from the group consisting of a compound represented by the following formula (2-1), a compound represented by the following formula (2-2), a compound represented by the following formula (2-3), and a compound represented by the following formula (2-4).

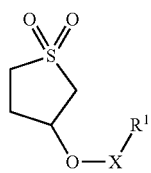

(1)

In the formula (1), X represents a sulfonyl group or a carbonyl group, and $R^1$ represents an optionally substituted alkyl group having 1 to 4 carbon atoms, an optionally substituted alkenyl group having 2 to 4 carbon atoms, an optionally substituted alkynyl group having 2 to 4 carbon atoms, an optionally substituted aryl group, an optionally substituted alkoxy group having 1 to 4 carbon atoms, an optionally substituted alkenyloxy group having 2 to 4 carbon atoms, an optionally substituted alkynyloxy group having 2 to 4 carbon atoms, or an optionally substituted aryloxy group.

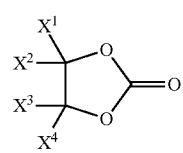

(2-1)

In the formula (2-1), $X^1$, $X^2$, $X^3$, and $X^4$ each independently represent a hydrogen atom, a fluorine atom, a chlorine atom, a vinyl group, an allyl group, or an alkyl group having 1 to 3 carbon atoms and optionally substituted with a halogen atom.

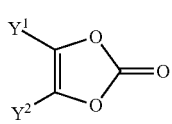

(2-2)

In the formula (2-2), $Y^1$ and $Y^2$ each independently represent a hydrogen atom, a fluorine atom, a chlorine atom, or an alkyl group having 1 to 3 carbon atoms and optionally substituted with a halogen atom.

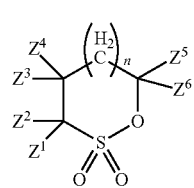

(2-3)

In the formula (2-3), $Z^1$, $Z^2$, $Z^3$, $Z^4$, $Z^5$, and $Z^6$ each independently represent a hydrogen atom, a fluorine atom, a chlorine atom, or an alkyl group having 1 to 3 carbon atoms and optionally substituted with a halogen atom, and n represents 0 or 1.

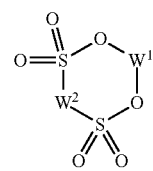

(2-4)

In the formula (2-4), $W^1$ and $W^2$ each independently represent an optionally branched, and substituted or unsubstituted alkylene group having 1 to 3 carbon atoms, an optionally branched, and substituted or unsubstituted perfluoroalkylene group having 1 to 3 carbon atoms, an optionally branched, and substituted or unsubstituted fluoroalkylene group having 1 to 3 carbon atoms.

Advantageous Effects of Invention

According to the present invention, provided is an additive for nonaqueous electrolyte solutions to obtain an electricity storage device having a long lifespan and suppressed gas generation. The additive for nonaqueous electrolyte solutions according to the present invention can form a stable solid electrolyte interface (SEI) on the surface of an electrode to improve a capacity retention rate upon a cycle test and suppress a resistance increase upon the cycle test, and suppress gas generation in a case where the additive for nonaqueous electrolyte solutions is used in an electricity storage device such as a nonaqueous electrolyte solution secondary battery and an electric double layer capacitor. The additive for nonaqueous electrolyte solutions according to the present invention can exhibit a more remarkable effect, as compared with the related art, particularly in a case where a lithium-containing composite oxide having a high Ni ratio is used as a positive electrode.

BRIEF DESCRIPTION OF DRAWINGS

FIG. 1 is a cross-sectional view schematically showing an embodiment of an electricity storage device.

DESCRIPTION OF EMBODIMENTS

Hereinafter, embodiments of the present invention will be described in detail.

An additive for nonaqueous electrolyte solutions according to the present embodiment contains a first compound represented by the aforementioned formula (1) and at least one second compound selected from the group consisting of the compound represented by the aforementioned formula (2-1) (hereinafter also referred to as an "ethylene carbonate compound"), the compound represented by the aforementioned formula (2-2) (hereinafter also referred to as a "vinyl ethylene carbonate compound"), the compound represented by the aforementioned formula (2-3) (hereinafter also referred to as a "cyclic sulfonic acid ester compound"), and the compound represented by the aforementioned formula (2-4) (hereinafter also referred to as a "cyclic disulfonic acid ester compound").

With regard to $R^1$ in the formula (1), in a case where the alkyl group having 1 to 4 carbon atoms, the alkenyl group having 2 to 4 carbon atoms, the alkynyl group having 2 to 4 carbon atoms, the alkoxy group having 1 to 4 carbon atoms, the alkenyloxy group having 2 to 4 carbon atoms, or the alkynyloxy group having 2 to 4 carbon atoms is substituted, the substituent may be, for example, a halogen atom, an aryl group, a halogenated aryl group (for example, a fluorinated aryl group such as a 2-fluorophenyl group, a 3-fluorophenyl group, a 4-fluorophenyl group, and a perfluorophenyl group), an alkoxy group, a halogenated alkoxy group, or a combination thereof. With regard to $R^1$, in a case where the aryl group or the aryloxy group is substituted, the substituent may be, for example, a halogen atom, an alkyl group, a halogenated alkyl group (for example, a fluorinated alkyl group such as a trifluoromethyl group and a 2,2,2-trifluoroethyl group), an alkoxy group, a halogenated alkoxy group, or a combination thereof. In the present specification, an expression, "optionally substituted with a halogen atom", means that at least one hydrogen atoms in each of R' groups may be substituted with halogen atoms.

With regard to the first compound, X in the formula (1) may be a sulfonyl group from the viewpoint that the battery resistance is easily lowered and gas generation is easily further suppressed.

In $R^1$ in the formula (1), the alkyl group having 1 to 4 carbon atoms may be substituted with a halogen atom, an aryl group, or a halogenated aryl group. Examples of the alkyl group having 1 to 4 carbon atoms and optionally substituted with a halogen atom, an aryl group or a halogenated aryl group, include a methyl group, an ethyl group, an n-propyl group, an isopropyl group, an n-butyl group, an isobutyl group, a tert-butyl group, a benzyl group, a fluoromethyl group, a difluoromethyl group, a trifluoromethyl group, a 1-fluoroethyl group, a 2-fluoroethyl group, a 1,1-difluoroethyl group, a 1,2-difluoroethyl group, a 2,2-difluoroethyl group, a 2,2,2-trifluoroethyl group, a perfluoroethyl group, a 1-fluoro-n-propyl group, a 2-fluoro-n-propyl group, a 3-fluoro-n-propyl group, a 1,1-difluoro-n-propyl group, a 1,2-difluoro-n-propyl group, a 1,3-difluoro-n-propyl group, a 2,2-difluoro-n-propyl group, a 2,3-difluoro-n-propyl group, a 3,3-difluoro-n-propyl group, a 3,3,3-trifluoro-n-propyl group, a 2,2,3,3,3-pentafluoro-n-propyl group, a perfluoro-n-propyl group, a 1-fluoroisopropyl group, a 2-fluoroisopropyl group, a 1,2-difluoroisopropyl group, a 2,2-difluoroisopropyl group, a 2,2'-difluoroisopropyl group, a 2,2,2,2',2',2'-hexafluoroisopropyl group, a 1-fluoro-n-butyl group, a 2-fluoro-n-butyl group, a 3-fluoro-n-butyl group, a 4-fluoro-n-butyl group, a 4,4,4-trifluoro-n-butyl group, a perfluoro-n-butyl group, a 2-fluoro-tert-butyl group, a perfluoro-tert-butyl group, a (2-fluorophenyl)methyl group, a (3-fluorophenyl)methyl group, a (4-fluorophenyl)methyl group, and a (perfluorophenyl)methyl group. As the alkyl group, a methyl group may be selected from the viewpoint that battery resistance is easily further lowered.

In $R^1$ in the formula (1), the alkenyl group having 2 to 4 carbon atoms may be substituted with a halogen atom. Examples of the alkenyl group having 2 to 4 carbon atoms and optionally substituted with a halogen atom, include a vinyl group, an allyl group, an isopropenyl group, a 1-butenyl group, a 2-butenyl group, a 3-butenyl group, a 1-fluorovinyl group, a 2-fluorovinyl group, a 1,2-difluorovinyl group, a 2,2-difluorovinyl group, a perfluorovinyl group, a 1-fluoroallyl group, a 2-fluoroallyl group, a 3-fluoroallyl group, and a perfluoroallyl group. As the alkenyl group, an allyl group optionally substituted with a halogen atom may be selected from the viewpoint that a stronger SEI is easily formed.

In $R^1$ in the formula (1), the alkynyl group having 2 to 4 carbon atoms may be substituted with a halogen atom. Examples of the alkynyl group having 2 to 4 carbon atoms and optionally substituted with a halogen atom, include an ethynyl group, a 1-propynyl group, a 2-propynyl group, a 1-butynyl group, a 2-butynyl group, a 3-butynyl group, a 3-fluoro-1-propynyl group, a 3,3-difluoro-1-propynyl group, a perfluoro-1-propynyl group, a 1-fluoro-2-propynyl group, a 1,1-difluoro-2-propynyl group, a 3-fluoro-1-butynyl group, a 4-fluoro-1-butynyl group, a 3,4-difluoro-1-butynyl group, a 4,4-difluoro-1-butynyl group, and a perfluoro-1-butynyl group. As the alkynyl group, a 2-propynyl group which may be substituted with a halogen atom may be selected from the viewpoint that a stronger SEI is easily formed.

In $R^1$ in the formula (1), the aryl group may be substituted with a halogen atom, an alkyl group or a halogenated alkyl group. Examples of the aryl group which may be substituted with a halogen atom, an alkyl group or a halogenated alkyl group, include a phenyl group, a tolyl group, a xylyl group, a naphthyl group, a 2-fluorophenyl group, a 3-fluorophenyl group, a 4-fluorophenyl group, a 2,3-difluorophenyl group, a 2,4-difluorophenyl group, a 3,5-difluorophenyl group, a 2,4,6-trifluorophenyl group, a perfluorophenyl group, a 3-fluoro-2-methylphenyl group, a 4-fluoro-2-methylphenyl group, a 5-fluoro-2-methylphenyl group, a 6-fluoro-2-methylphenyl group, a 2-fluoro-3-methylphenyl group, a 4-fluoro-3-methylphenyl group, a 5-fluoro-3-methylphenyl group, a 6-fluoro-3-methylphenyl group, a 2-fluoro-4-methylphenyl group, a 3-fluoro-4-methylphenyl group, a 2-trifluoromethylphenyl group, a 3-trifluoromethylphenyl group, a 4-trifluoromethylphenyl group, a 2-(2,2,2-trifluoroethyl)phenyl group, a 3-(2,2,2-trifluoroethyl)phenyl group, a 4-(2,2,2-trifluoroethyl)phenyl group, a perfluorotolyl group, a 2-fluoronaphthalen-1-yl group, a 3-fluoronaphthalen-1-yl group, a 4-fluoronaphthalen-1-yl group, a 5-fluoronaphthalen-1-yl group, a 6-fluoronaphthalen-1-yl group, a 7-fluoronaphthalen-1-yl group, a 8-fluoronaphthalen-1-yl group, a 1-fluoronaphthalen-2-yl group, a 3-fluoronaphthalen-2-yl group, a 4-fluoronaphthalen-2-yl group, a 5-fluoronaphthalen-2-yl group, a 6-fluoronaphthalen-2-yl group, a 7-fluoronaphthalen-2-yl group, a 8-fluoronaphthalen-2-yl group, and a perfluoronaphthyl group.

In $R^1$ in the formula (1), the alkoxy group having 1 to 4 carbon atoms may be substituted with a halogen atom, an aryl group or a halogenated aryl group. Examples of the alkoxy group having 1 to 4 carbon atoms and optionally substituted with a halogen atom, an aryl group or a halogenated aryl group, include a methoxy group, an ethoxy group, an n-propoxy group, an isopropoxy group, an n-butoxy group, a tert-butoxy group, an isobutoxy group, a benzyloxy group, a fluoromethoxy group, a difluoromethoxy group, a trifluoromethoxy group, a 1-fluoroethoxy group, a 2-fluoroethoxy group, a 1,1-difluoroethoxy group, a 1,2-difluoroethoxy group, a 2,2-difluoroethoxy group, a 2,2,2-trifluoroethoxy group, a perfluoroethoxy group, a 1-fluoro-n-propoxy group, a 2-fluoro-n-propoxy group, a 3-fluoro-n-propoxy group, a 1,1-difluoro-n-propoxy group, a 1,2-difluoro-n-propoxy group, a 1,3-difluoro-n-propoxy group, a 2,2-difluoro-n-propoxy group, a 2,3-difluoro-n-propoxy group, a 3,3-difluoro-n-propoxy group, a 3,3,3-trifluoro-n-propoxy group, a 2,2,3,3,3-pentafluoro-n-propoxy group, a perfluoro-n-propoxy group, a 1-fluoroisopropoxy group, a 2-fluoroisopropoxy group, a 1,2-difluoroisopropoxy group, a 2,2-difluoroisopropoxy group, a 2,2'-difluoroisopropoxy group, a 2,2,2,2',2',2'-hexafluoroisopropoxy group, a 1-fluoro-n-butoxy group, a 2-fluoro-n-butoxy group, a 3-fluoro-n-butoxy group, a 4-fluoro-n-butoxy group, a 4,4,4-trifluoro-n-butoxy group, a perfluoro-n-butoxy group, a 2-fluoro-tert-butoxy group, a perfluoro-tert-butoxy group, a (2-fluorophenyl)

methoxy group, a (3-fluorophenyl)methoxy group, a (4-fluorophenyl)methoxy group, and a (perfluorophenyl)methoxy group.

In $R^1$ in the formula (1), the alkenyloxy group having 2 to 4 carbon atoms may be substituted with a halogen atom. Examples of the alkenyloxy group having 2 to 4 carbon atoms and optionally substituted with a halogen atom, include a vinyloxy group, an isopropenyloxy group, a 2-propenyloxy group, a 1-methyl-2-propenyloxy group, a 2-methyl-2-propenyloxy group, a 1-butenyloxy group, a 2-butenyloxy group, a 3-butenyloxy group, a 1-fluorovinyloxy group, a 2-fluorovinyloxy group, a 1,2-difluorovinyloxy group, a 2,2-difluorovinyloxy group, a perfluorovinyloxy group, a 1-fluoroallyloxy group, a 2-fluoroallyloxy group, a 3-fluoroallyloxy group, and a perfluoroallyloxy group.

In $R^1$ in the formula (1), the alkynyloxy group having 2 to 4 carbon atoms may be substituted with a halogen atom. Examples of the alkynyloxy group having 2 to 4 carbon atoms and optionally substituted with a halogen atom, include an ethynyloxy group, a 1-propynyloxy group, a 2-propynyloxy group, a 1-methyl-2-propynyloxy group, a 1-butynyloxy group, a 2-butynyloxy group, a 3-butynyloxy group, a 3-fluoro-1-propynyloxy group, a 3,3-difluoro-1-propynyloxy group, a perfluoro-1-propynyloxy group, a 1-fluoro-2-propynyloxy group, a 1,1-difluoro-2-propynyloxy group, a 3-fluoro-1-butynyloxy group, a 4-fluoro-1-butynyloxy group, a 3,4-difluoro-1-butynyloxy group, a 4,4-difluoro-1-butynyloxy group, and a perfluoro-1-butynyloxy group.

In $R^1$ in the formula (1), the aryloxy group may be substituted with a halogen atom, an alkyl group, a halogenated alkyl group or an alkoxy group. Examples of the aryloxy group which may be substituted with a halogen atom, an alkyl group, a halogenated alkyl group or an alkoxy group, include a phenoxy group, a 2-methylphenoxy group, a 3-methylphenoxy group, a 4-methylphenoxy group, a 2-ethylphenoxy group, a 3-ethylphenoxy group, a 4-ethylphenoxy group, a 2-methoxyphenoxy group, a 3-methoxyphenoxy group, a 4-methoxyphenoxy group, a 2-fluorophenoxy group, a 3-fluorophenoxy group, a 4-fluorophenoxy group, a 2,3-difluorophenoxy group, a 2,4-difluorophenoxy group, a 3,5-difluorophenoxy group, a 2,4,6-trifluorophenoxy group, a perfluorophenoxy group, a 3-fluoro-2-methylphenoxy group, a 4-fluoro-2-methylphenoxy group, a 5-fluoro-2-methylphenoxy group, a 6-fluoro-2-methylphenoxy group, a 2-fluoro-3-methylphenoxy group, a 4-fluoro-3-methylphenoxy group, a 5-fluoro-3-methylphenoxy group, a 6-fluoro-3-methylphenoxy group, a 2-fluoro-4-methylphenoxy group, a 3-fluoro-4-methylphenoxy group, a 2-trifluoromethylphenoxy group, a 3-trifluoromethylphenoxy group, and a 4-trifluoromethylphenoxy group.

In a case where each group of $R^1$ in the formula (1) is substituted with a halogen atom, examples of the halogen atom include an iodine atom, a bromine atom, and a fluorine atom. From the viewpoint that the battery resistance is easily further lowered, the fluorine atom can be selected as the halogen atom.

From the viewpoint that the battery resistance is easily further lowered, $R^1$ in the formula (1) may be an alkyl group having 1 to 4 carbon atoms or having 1 to 3 carbon atoms and optionally substituted with a halogen atom, an aryl group or a halogenated aryl group, an alkenyl group having 2 to 4 carbon atoms and optionally substituted with a halogen atom, an alkynyl group having 2 to 4 carbon atoms and optionally substituted with a halogen atom, or an aryl group which may be substituted with a halogen atom, an alkyl group or a halogenated alkyl group.

Incorporating a group having an unsaturated bond into $R^1$ in the formula (1), makes it easy to faun a stronger SEI, whereby a capacity retention rate is further improved. From such a viewpoint, $R^1$ may be an alkenyl group having 2 to 4 carbon atoms and optionally substituted with a halogen atom, an alkynyl group having 2 to 4 carbon atoms and optionally substituted with a halogen atom, an aryl group which may be substituted with a halogen atom, an alkyl group or a halogenated alkyl group, an alkenyloxy group having 2 to 4 carbon atoms and optionally substituted with a halogen atom, an alkynyloxy group having 2 to 4 carbon atoms and optionally substituted with a halogen atom, or an aryloxy group which may be substituted with a halogen atom, an alkyl group, a halogenated alkyl group or an alkoxy group.

From the viewpoint of exhibiting more excellent ion conductivity, $R^1$ in the formula (1) may be an alkenyloxy group having 2 to 4 carbon atoms and optionally substituted with a halogen atom, an alkynyloxy group having 2 to 4 carbon atoms and optionally substituted with a halogen atom, or an aryloxy group which may be substituted with a halogen atom, an alkyl group, a halogenated alkyl group or an alkoxy group.

Specific examples of the first compound represented by the formula (1) include a compound represented by the formula (1-1), (1-2), (1-3), (1-4), (1-5), (1-6), (1-7), (1-8), (1-9), (1-10), (1-11), (1-12), or (1-13).

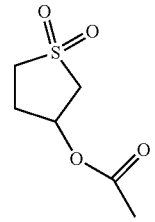

(1-1)

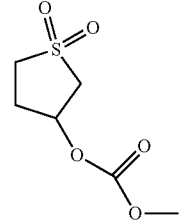

(1-2)

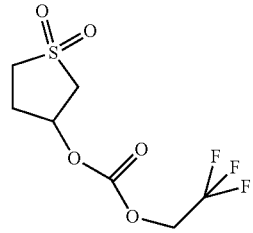

(1-3)

(1-4) 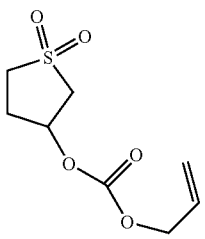

(1-5) 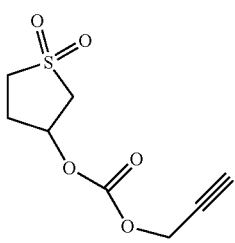

(1-6) 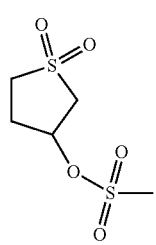

(1-7) 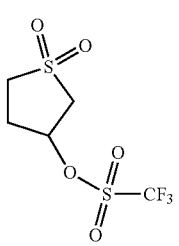

(1-8) 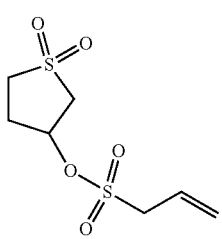

(1-9) 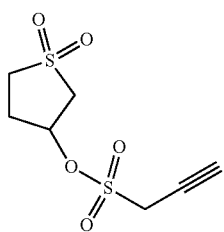

(1-10) 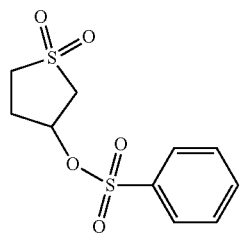

(1-11) 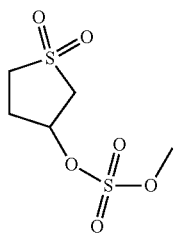

(1-12) 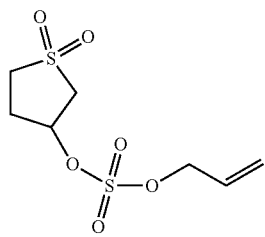

(1-13) 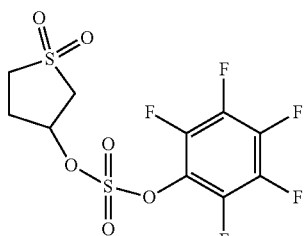

With regard to the ethylene carbonate compound, which is the second compound, from the viewpoint that a stronger SEI is easily formed, $X^1$, $X^2$, $X^3$, and $X^4$ in the formula (2-1) may be each independently a hydrogen atom or a fluorine atom.

In $X^1$ to $X^4$, examples of the alkyl group having 1 to 3 carbon atoms and optionally substituted with a halogen atom, include a methyl group, an ethyl group, an n-propyl group, an isopropyl group, and a trifluoromethyl group. As the alkyl group having 1 to 4 carbon atoms, a methyl group may be selected.

Specific examples of the compound represented by the formula (2-1) include a compound represented by the formula (2-1a), (2-1b), (2-1c), (2-1d), (2-1e), (2-1f), (2-1g), or (2-1h).

(2-1a) 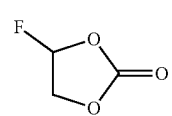

-continued

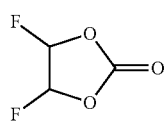
(2-1b)

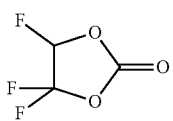
(2-1c)

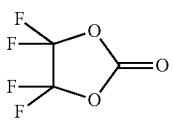
(2-1d)

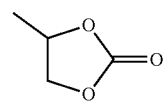
(2-1e)

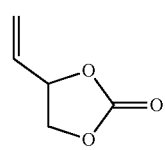
(2-1f)

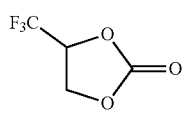
(2-1g)

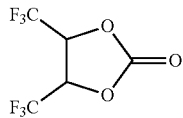
(2-1h)

With regard to the vinylene carbonate compound, which is the second compound, as the alkyl group having 1 to 3 carbon atoms and optionally substituted with a halogen atom, as $Y^1$ and $Y^2$ in the formula (2-2), the same ones as the alkyl groups shown for $X^1$, $X^2$, $X^3$, and $X^4$ in the formula (2-1) can be selected. From the viewpoint that a stronger SEI is easily formed, a hydrogen atom may be selected as $Y^1$ and $Y^2$ in the formula (2-2).

Specific examples of the compound represented by the formula (2-2) include a compound represented by the formula (2-2a), (2-2b), (2-2c), or (2-2d).

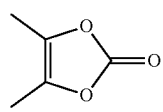
(2-2a)

(2-2b)

(2-2c)

(2-2d)

With regard to the cyclic sulfonic acid ester compound, which is the second compound, as the alkyl group having 1 to 3 carbon atoms and optionally substituted with a halogen atom, as $Z^1$, $Z^2$, $Z^3$, $Z^4$, $Z^5$, and $Z^6$ in the formula (2-3), the same ones as for $X^1$, $X^2$, $X^3$, and $X^4$ in the formula (2-1) can be selected. From the viewpoint that a stronger SEI is easily formed, a hydrogen atom may be selected as $Z^1$, $Z^2$, $Z^3$, $Z^4$, $Z^5$, and $Z^6$. From the same viewpoint, n may be 0.

Specific examples of the compound represented by the formula (2-3) include a compound represented by the formula (2-3a), (2-3b), or (2-3c).

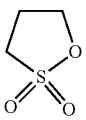
(2-3a)

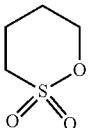
(2-3b)

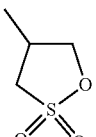
(2-3c)

With regard to the cyclic disulfonic acid ester compound, which is the second compound, as $W^1$ and $W^2$ in the formula (2-4), an alkylene group having 1 or 2 carbon atoms, a perfluoroalkylene group having 1 or 2 carbon atoms, or a fluoroalkylene group having 1 or 2 carbon atoms may be selected from the viewpoint that a stronger SEI is easily formed. $W^1$ and $W^2$ may be a methylene group, an ethylene group, a fluoromethylene group, or a perfluoromethylene group Specific examples of the cyclic disulfonic acid ester compound represented by the formula (2-4) include a compound represented by the formula (2-4a), (2-4b), (2-4c), (2-4d), (2-4e), (2-4f), (2-4g), or (2-4h).

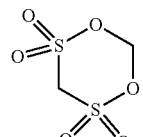
(2-4a)

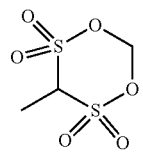
(2-4b)

-continued

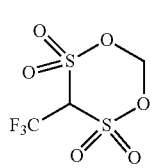
(2-4c)

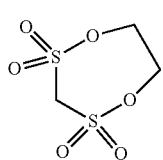
(2-4d)

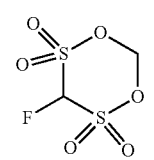
(2-4e)

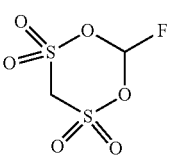
(2-4f)

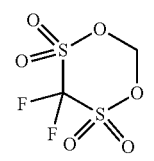
(2-4g)

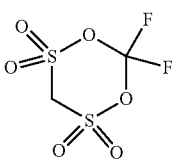
(2-4h)

In the additive for nonaqueous electrolyte solutions, the ratio of the content of the first compound to the content of the second compound (the content of the first compound:the content of the second compound) may be 1:0.1 to 1:30 or 1:0.25 to 1:10 in terms of a mass ratio. In a case where the second compounds are two or more compounds of the compound represented by the formula (2-1), the compound represented by the formula (2-2), the compound represented by the formula (2-3), and the compound represented by in the formula (2-4), the ratio of the contents is a ratio of each content of the two or more second compounds (the content of the compound represented by the formula (2-1), the compound represented by the formula (2-2), the compound represented by the formula (2-3), or the compound represented by the formula (2-4)). Thus, an effect caused by a combination of the first compound and the second compound is more remarkably exhibited. From the same viewpoint, the ratio of the content of each compound can be set as follows.

In a case where the additive for nonaqueous electrolyte solutions contains the compound represented by the formula (2-1) and the compound represented by the formula (2-2) as the second compound, the ratio of the content of the first compound and the content of each of the compound represented by the formula (2-1) and the compound represented by the formula (2-2) (the content of the first compound:the content of the vinylene carbonate compound represented by the formula (2-1), and the content of the first compound:the content of the ethylene carbonate compound represented by the formula (2-2)) may be 1:0.1 to 1:30 in terms of a mass ratio.

In a case where the additive for nonaqueous electrolyte solutions contains the compound represented by the formula (2-3) and the compound represented by the formula (2-4) as the second compound, the ratio of the content of the first compound and the content of each of the compound represented by the formula (2-3) and the compound represented by the formula (2-4) (the content of the first compound:the content of the compound represented by the formula (2-3), and the content of the first compound:the content of the compound represented by the formula (2-4)) may be 1:0.2 to 1:10 in terms of a mass ratio.

The combination of each of the compounds and content rate (mass ratio) thereof, and preferred examples thereof are shown in Table 1.

TABLE 1

| First compound | Second compound | | | |
|---|---|---|---|---|
| | Formula (2-1) | Formula (2-2) | Formula (2-3) | Formula (2-4) |
| 1 | 0.5 to 30 | — | — | — |
| 1 | — | 0.25 to 10 | — | — |
| 1 | — | — | 0.25 to 10 | — |
| 1 | — | — | — | 0.25 to 10 |
| 1 | 0.5 to 30 | 0.25 to 10 | — | — |
| 1 | 0.5 to 30 | — | 0.25 to 10 | — |
| 1 | — | 0.25 to 10 | 0.25 to 10 | — |
| 1 | 0.5 to 30 | — | — | 0.25 to 10 |
| 1 | — | 0.25 to 10 | — | 0.25 to 10 |
| 1 | 0.5 to 30 | 0.25 to 10 | 0.25 to 10 | — |
| 1 | 0.5 to 30 | 0.25 to 10 | — | 0.25 to 10 |

The compound represented by the formula (1) can be synthesized by combination of usual reactions using available raw materials. For example, the first compound represented by the formula (1) can be synthesized in accordance with a method in which a halide is reacted with 3-hydroxysulfolene.

Specific examples of a case where the compound represented by the formula (1-1) is produced are shown below. First, 3-hydroxysulfolene and triethylamine are dissolved in an organic solvent, then acetyl chloride is added dropwise thereto, and the mixture is reacted by stirring it at room temperature for 2 hours. Thereafter, a desired compound can be obtained by washing the obtained reaction product with water and concentrating the oil layer.

As the second compound, a commercially available product may be used. Further, for example, as the compound represented by the formula (2-1), the compound produced in accordance with the method described in Japanese Unexamined Patent Publication No. 2010-138157 may be used; as the compound represented by the formula (2-2), the compound produced in accordance with the method described in Japanese Unexamined Patent Publication No. H11-180974 may be used; as the compound represented by the formula (2-3), the compound produced in accordance with the method described in Japanese Unexamined Patent Publication No. 2001-52738 may be used; and as the compound represented by the formula (2-4), the compound produced in accordance with the method described in Japanese Unexamined Patent Publication No. 2005-336155 may be used.

The additive for nonaqueous electrolyte solutions according to the present embodiment may include, in addition to the first compound and the second compound, other compounds and/or other components that can contribute to formation of an SEI within a range where the effect exhibited by the present invention is not remarkably impaired. Examples of such other compounds and/or other components include a negative electrode protecting agent, a positive electrode protecting agent, a flame retardant, an anti-overcharging agent, lithium monofluorophosphate and lithium difluorophosphate.

The nonaqueous electrolyte solution according to the present embodiment contains the first compound and the second compound according to the embodiment, and an electrolyte. The nonaqueous electrolyte solution according to the present embodiment may further contain, as a nonaqueous solvent, a compound different from the first compound and the second compound as the additive. A part or a whole of the first compound and/or the second compound may serve as both the additive and the nonaqueous solvent.

The content of the first compound as the additive may be 0.05% by mass to 5% by mass with respect to the total amount of the nonaqueous electrolyte solution. The content of the first compound may be 0.1% by mass or more, or 3% by mass or less, with respect to the total amount of the nonaqueous electrolyte solution.

The content of the second compound as the additive may be 0.05% by mass to 5% by mass with respect to the total amount of the nonaqueous electrolyte solution. The content of the second compound may be 0.1% by mass or more, or 3% by mass or less, with respect to the total amount of the nonaqueous electrolyte solution. In addition, in a case where the second compounds are two or more compounds of the compound represented by the formula (2-1), the compound represented by the formula (2-2), the compound represented by the formula (2-3), and the compound represented by in the formula (2-4), the content is the amount of each of the two or more second compounds.

The total content of the first compound and the second compound as the additive may be 0.1% by mass to 10% by mass with respect to the total amount of the nonaqueous electrolyte solution. In a case where the total content of the first compound and the second compound is 10% by mass or less, there is a less concern that a thick SEI may be formed on the electrode and the resistance may be increased. In a case where the total content of the first compound and the second compound is 0.1% by mass or more, an effect of increasing the resistance characteristics is further enhanced.

From the same viewpoint, in a case where the nonaqueous electrolyte solution contains two or more compounds selected from the group consisting of the compound represented by the formula (2-1), the compound represented by the formula (2-2), the compound represented by the formula (2-3), and the compound represented by the formula (2-4) as the second compound, the total content of the first compound and the second compound may be 0.1% by mass to 10% by mass with respect to the total amount of the nonaqueous electrolyte solution.

Furthermore, from the same viewpoint, in a case where the nonaqueous electrolyte solution contains four compounds of the compound represented by the formula (2-1), the compound represented by the formula (2-2), the compound represented by the formula (2-3), and the compound represented by the formula (2-4) as the second compound, the total content of the first compound and the second compound may be 0.5% by mass to 10% by mass with respect to the total amount of the nonaqueous electrolyte solution.

From the viewpoint that a stronger SEI is easily formed, as the second compound, a combination of the compound represented by the formula (2-1) and the compound represented by the formula (2-2); a combination of the compound represented by the formula (2-1) and the compound represented by the formula (2-3); a combination of the compound represented by the formula (2-2) and the compound represented by the formula (2-3); a combination of the compound represented by the formula (2-1) and the compound represented by the formula (2-4); a combination of the compound represented by the formula (2-2) and the compound represented by the formula (2-4); a combination of the compound represented by the formula (2-1), the compound represented by the formula (2-2), and the compound represented by the formula (2-3); or a combination of the compound represented by the formula (2-1), the compound represented by the formula (2-2), and the compound represented by the formula (2-4) may be selected.

The ratio of the content of the first compound to the content of the second compound in the nonaqueous electrolyte solution may be in the same range as the ratio of the additive for nonaqueous electrolyte solutions.

The electrolyte may be a lithium salt which serves as an ion source of lithium ions. The electrolyte may be at least one selected from the group consisting of $LiAlCl_4$, $LiBF_4$, $LiPF_6$, $LiClO_4$, $LiAsF_6$, and $LiSbF_6$. As the electrolyte, $LiBF_4$ and/or $LiPF_6$ may be selected from the viewpoints that they can increase the ion conductivity of the electrolyte solution and have an action of suppressing deterioration of the performance of an electricity storage device by a long-term use due to their oxidation-reduction resistance characteristics. These electrolytes may be used alone or in combination of two or more kinds thereof.

In a case where the electrolyte is $LiBF_4$ and/or $LiPF_6$, these may be combined with cyclic carbonates and chained carbonate as the nonaqueous solvent. In a case where the electrolyte is $LiBF_4$ and/or $LiPF_6$, these may be combined with ethylene carbonate and diethyl carbonate.

The concentration of the electrolyte in the nonaqueous electrolyte solution may be 0.1 mol/L or more, or 2.0 mol/L or less, with respect to the volume of the nonaqueous electrolyte solution. In a case where the concentration of the electrolyte is 0.1 mol/L or more, electrical conductivity and the like of the nonaqueous electrolyte solution can be sufficiently secured. Thus, the discharge characteristics and the charge characteristics of the electricity storage device are easily obtained. In a case where the concentration of the electrolyte is 2.0 mol/L or less, it is possible to suppress an increase in the viscosity of the nonaqueous electrolyte solution and in particular, easily secure the ion mobility. In a case where the ion mobility is not sufficient, there is a possibility that the electrical conductivity and the like cannot be sufficiently secured and the charge/discharge characteristics and the like of an electricity storage device may be adversely affected. From the same viewpoint, the concentration of the electrolyte may be 0.5 mol/L or more, or 1.5 mol/L or less.

The nonaqueous electrolyte solution may further contain a nonaqueous solvent. The nonaqueous solvent may be the same compound as the first compound or the second compound, or may be different from the first compound and the second compound. From the viewpoint that the viscosity of the obtained nonaqueous electrolyte solution is suppressed to a lower value, as the nonaqueous solvent, an aprotic solvent can be selected as the nonaqueous solvent. The aprotic solvent may be at least one selected from the group consisting of a cyclic carbonate, a chained carbonate, an aliphatic carboxylic acid ester, a lactone, a lactam, a cyclic ether, a chained ether, a sulfone, a nitrile, and a halogen derivative thereof. As the aprotic solvent, the cyclic carbonate or the chained carbonate can be selected from, and a combination of the cyclic carbonate and the chained carbonate can also be selected as the aprotic solvent.

Examples of the cyclic carbonate include ethylene carbonate, propylene carbonate, butylene carbonate, and fluoroethylene carbonate. Examples of the chained carbonate include dimethyl carbonate, diethyl carbonate, and ethyl methyl carbonate. Examples of the aliphatic carboxylic acid ester include methyl acetate, ethyl acetate, methyl propionate, ethyl propionate, methyl butyrate, methyl isobutyrate, and methyl trimethylacetate. Examples of the lactone include γ-butyrolactone. Examples of the lactam include ε-caprolactam and N-methylpyrrolidone. Examples of the cyclic ether include tetrahydrofuran, 2-methyltetrahydrofuran, tetrahydropyran, and 1,3-dioxolane. Examples of the chained ether include 1,2-diethoxyethane and ethoxymethoxyethane. Examples of the sulfone include sulfolane. Examples of the nitrile include acetonitrile. Examples of the halogen derivative include 4-fluoro-1,3-dioxolan-2-one, 4-chloro-1,3-dioxolan-2-one, and 4,5-difluoro-1,3-dioxolan-2-one. These nonaqueous solvents may be used alone or in combination of two or more kinds thereof. These nonaqueous solvents are particular suitable for nonaqueous electrolyte solution secondary batteries such as a lithium ion battery, for example.

In a case where an ethylene carbonate compound represented by the formula (2-1), in which at least one of $X^1$, $X^2$, $X^3$, and $X^4$ is a fluorine atom, is contained as the additive in the nonaqueous electrolyte solution, the nonaqueous solvent may be a cyclic carbonate which is not substituted with a fluorine atom or a combination thereof with another solvent. The carbonate which is not substituted with a fluorine atom may be at least one selected from the group consisting of ethylene carbonate, propylene carbonate, butylene carbonate, dimethyl carbonate, diethyl carbonate, and ethyl methyl carbonate.

The content of the nonaqueous solvent in the nonaqueous electrolyte solution may be, for example, 70% to 99% by mass with respect to the total amount of the nonaqueous electrolyte solution.

The electricity storage device according to the present embodiment is mainly formed of the nonaqueous electrolyte solution, a positive electrode, and a negative electrode. Specific examples of the electricity storage device include a nonaqueous electrolyte solution secondary battery (a lithium ion battery and the like). The nonaqueous electrolyte solution according to the present embodiment is particularly effective in applications involving a lithium ion battery.

FIG. 1 is a cross-sectional view schematically showing one embodiment of an electricity storage device. The electricity storage device 1 shown in FIG. 1 is a nonaqueous electrolyte solution secondary battery. The electricity storage device 1 includes a positive electrode plate 4 (positive electrode), a negative electrode plate 7 (negative electrode) facing the positive electrode plate 4, a nonaqueous electrolyte solution 8 disposed between the positive electrode plate 4 and the negative electrode plate 7, and a separator 9 provided in the nonaqueous electrolyte solution 8. The positive electrode plate 4 has a positive electrode collector 2 and a positive electrode active material layer 3 provided on the side of the nonaqueous electrolyte solution 8. The negative electrode plate 7 has a negative electrode collector 5 and a negative electrode active material layer 6 provided on the side of the nonaqueous electrolyte solution 8. As the nonaqueous electrolyte solution 8, the nonaqueous electrolyte solution according to the above-mentioned embodiment can be used. Although FIG. 1 shows a nonaqueous electrolyte solution secondary battery as the electricity storage device, the electricity storage device to which the nonaqueous electrolyte solution can be applied is not limited thereto, and it may be another electricity storage device such as an electric double layer capacitor.

The positive electrode collector 2 and the negative electrode collector 5 may be each, for example, a metal foil formed of a metal such as aluminum, copper, nickel, and stainless steel.

The positive electrode active material layer 3 includes a positive electrode active material. The positive electrode active material may be a lithium-containing composite oxide. Specific examples of the lithium-containing composite oxide include $LiMnO_2$, $LiFeO_2$, $LiMn_2O_4$, $Li_2FeSiO_4$, $LiN_{1/3}Co_{1/3}Mn_{1/3}O_2$, $LiNi_5Co_2Mn_3O_2$, $Li_zNi_{(1-x-y)}Co_xM_yO_2$ (x, y, and z are numerical values satisfying $0.01 \leq x \leq 0.20$, $0 \leq y \leq 0.20$, and $0.97 \leq z \leq 1.20$, and M represents at least one element selected from Mn, V, Mg, Mo, Nb, and Al), $LiFePO_4$, and $Li_zCO_{(1-x)}M_xO_2$ (x and z are numerical values satisfying $0 \leq x \leq 0.1$ and $0.97 \leq z \leq 1.20$, and M represents at least one element selected from Mn, Ni, V, Mg, Mo, Nb, and Al). From the viewpoint that the additive for nonaqueous electrolyte solutions according to the present embodiment can coat the surface effectively, the positive electrode active material may be $Li_zNi_{(1-x-y)}Co_xM_yO_2$ (x, y, and z are numerical values satisfying $0.01 \leq x \leq 0.15$, $0 \leq y \leq 0.15$, and $0.97 \leq z \leq 1.20$, and M represents at least one element selected from Mn, Ni, V, Mg, Mo, Nb, and Al), or $Li_zCO_{(1-x)}M_xO_2$ (x and z are numerical values satisfying $0 \leq x \leq 0.1$, and $0.97 \leq z \leq 1.20$, and M represents at least one element selected from Mn, V, Mg, Mo, Nb, and Al). In particular, in a case where a positive electrode active material having a high Ni ratio such as $Li_zNi_{(1-x-y)}Co_xM_yO_2$ (x, y, and z are numerical values satisfying $0.01 \leq x \leq 0.15$, $0 \leq y \leq 0.15$, and $0.97 \leq z \leq 1.20$, and M represents at least one element selected from Mn, Ni, V, Mg, Mo, Nb, and Al) is used, there is a tendency that gas is easily generated, but even in the case, gas generation can be effectively suppressed by combination of the first compound and the second compound.

The negative electrode active material layer 6 includes a negative electrode active material. The negative electrode active material may be, for example, a material capable of absorbing and releasing lithium. Examples of such a material include a carbon material such as crystalline carbon (natural graphite, artificial graphite, and the like), amorphous carbon, carbon-coated graphite, and resin-coated graphite, and an oxide material such as indium oxide, silicon oxide, tin oxide, lithium titanate, zinc oxide, and lithium oxide. The negative electrode active material may also be a lithium metal or a metal material capable of forming an alloy together with lithium. Specific examples of the metal capable of forming an alloy together with lithium include Cu, Sn, Si, Co, Mn, Fe, Sb, and Ag. A binary or ternary alloy including any of these metals and lithium can also be used as the negative electrode active material. These negative electrode active materials may be used alone or in combination of two or more kinds thereof.

From the viewpoint of achieving a higher energy density, a carbon material such as graphite and an Si-based active material such as Si, an Si alloy, and an Si oxide may be combined. From the viewpoint of achieving both of the cycle characteristics and the higher energy density, graphite and the Si-based active material may be combined. With regard to such a combination, the mass ratio of the Si-based active material to the total mass of the carbon material and the Si-based active material may be from 0.5% by mass to 95% by mass, from 1% by mass to 50% by mass, or from 2% by mass to 40% by mass.

The positive electrode active material layer 3 and the negative electrode active material layer 6 may further include a binder. Examples of the binder include polyvinylidene fluoride (PVdF), a vinylidene fluoride-hexafluoropropylene copolymer, a vinylidene fluoride-tetrafluoroethylene copolymer, a styrene-butadiene copolymerized rubber, carboxymethyl cellulose, polytetrafluoroethylene, polypropylene, polyethylene, polyimide, polyamideimide, polyacrylic acid, polyvinyl alcohol, acrylic acid-polyacrylonitrile, polyacrylamide, polymethacrylic acid, and a copolymer thereof. The binders may be the same or different in the positive electrode active material layer and the anode active material layer.

The positive electrode active material layer 3 and the negative electrode active material layer 6 may further include a conductive auxiliary material for the purpose of lowering the resistance. Examples of the conductive auxiliary material include carbonaceous fine particles such as graphite, carbon black, acetylene black, and Ketjen black, and carbon fibers.

As the separator 9, for example, a single-layer or laminate porous film formed of polyethylene, polypropylene, a fluorine resin, or the like, or a woven fabric or nonwoven fabric porous film can be used.

Specific forms such as a shape and a thickness of each of members constituting the electricity storage device can be set as appropriate, by those skilled in the art. The configurations of the electricity storage device are not limited to the embodiments of FIG. 1, and modifications may be made as appropriate.

EXAMPLES

Hereinafter, the present invention will be described in more detail with reference to Examples.

1. Preparation of Nonaqueous Electrolyte Solution (Examples 1 to 21 and Comparative Examples 1 to 6)

Example 1

Ethylene carbonate (EC) and diethyl carbonate (DEC) were mixed at a volume ratio of EC:DEC=30:70 to obtain a nonaqueous mixed solvent. $LiPF_6$ as an electrolyte was dissolved in the nonaqueous mixed solvent to a concentration of 1.0 mol/L. The compound represented by the formula (1-1) and the compound represented by the formula (2-1a) as additives for nonaqueous electrolyte solutions were added to the obtained solution to obtain a nonaqueous electrolyte solution. The contents of the compound represented by the formula (1-1) and the compound represented by the formula (2-1a) were 1.0% by mass and 1.0% by mass, respectively, with respect to the total amount of the nonaqueous electrolyte solution.

Example 2

A nonaqueous electrolyte solution was prepared in the same manner as in Example 1, except that the content of the compound represented by the formula (1-1) was set to 2.0% by mass.

Example 3

A nonaqueous electrolyte solution was prepared in the same manner as in Example 1, except that the content of the compound represented by the formula (2-1a) was set to 2.0% by mass.

Example 4

A nonaqueous electrolyte solution was prepared in the same manner as in Example 1, except that the compound represented by the formula (2-1a) was changed to the compound represented by the formula (2-1b).

Example 5

A nonaqueous electrolyte solution was prepared in the same manner as in Example 1, except that the compound represented by the for (1-1) was changed to the compound represented by the formula (1-6).

Example 6

A nonaqueous electrolyte solution was prepared in the same manner as in Example 1, except that the compound represented by the formula (1-1) was changed to the compound represented by the formula (1-10).

Example 7

A nonaqueous electrolyte solution was prepared in the same manner as in Example 1, except that the compound represented by the formula (2-1a) was changed to the compound represented by the formula (2-2a).

Example 8

A nonaqueous electrolyte solution was prepared in the same manner as in Example 7, except that the content of the compound represented by the formula (1-1) was set to 2.0% by mass.

Example 9

A nonaqueous electrolyte solution was prepared in the same manner as in Example 7, except that the compound represented by the formula (1-1) was changed to the compound represented by the formula (1-6).

Example 10

A nonaqueous electrolyte solution was prepared in the same manner as in Example 9, except that the content of the compound represented by the formula (2-2a) was set to 2.0% by mass.

Example 11

A nonaqueous electrolyte solution was prepared in the same manner as in Example 7, except that the compound represented by the formula (1-1) was changed to the compound represented by the formula (1-10).

Example 12

A nonaqueous electrolyte solution was prepared in the same manner as in Example 1, except that the compound represented by the formula (2-1a) was changed to the compound represented by the formula (2-3a).

Example 13

A nonaqueous electrolyte solution was prepared in the same manner as in Example 12, except that the content of the compound represented by the formula (1-1) was set to 2.0% by mass.

Example 14

A nonaqueous electrolyte solution was prepared in the same manner as in Example 12, except that the content of the compound represented by the formula (2-3a) was set to 2.0% by mass.

Example 15

A nonaqueous electrolyte solution was prepared in the same manner as in Example 12, except that the compound represented by the formula (1-1) was changed to the compound represented by the formula (1-6).

Example 16

A nonaqueous electrolyte solution was prepared in the same manner as in Example 12, except that the compound represented by the formula (1-1) was changed to the compound represented by the formula (1-10).

Example 17

A nonaqueous electrolyte solution was prepared in the same manner as in Example 1, except that the compound represented by the formula (2-1a) was changed to the compound represented by the formula (2-4a).

Example 18

A nonaqueous electrolyte solution was prepared in the same manner as in Example 17, except that the content of the compound represented by the formula (1-1) was set to 2.0% by mass.

Example 19

A nonaqueous electrolyte solution was prepared in the same manner as in Example 17, except that the compound represented by the formula (1-1) was changed to the compound represented by the formula (1-6).

Example 20

A nonaqueous electrolyte solution was prepared in the same manner as in Example 19, except that the content of the compound represented by the formula (2-4a) was set to 1.5% by mass.

Example 21

A nonaqueous electrolyte solution was prepared in the same manner as in Example 17, except that the compound represented by the formula (1-1) was changed to the compound represented by the formula (1-10).

Comparative Example 1

A nonaqueous electrolyte solution was prepared in the same manner as in Example 1, except that the compound represented by the formula (1-1) and the compound represented by the formula (2-1a) were not added.

Comparative Example 2

A nonaqueous electrolyte solution was prepared in the same manner as in Example 1, except that the compound represented by the formula (2-1a) was not added.

Comparative Example 3

A nonaqueous electrolyte solution was prepared in the same manner as in Example 1, except that the compound represented by the formula (1-1) was not added.

Comparative Example 4

A nonaqueous electrolyte solution was prepared in the same manner as in Comparative Example 3, except that the compound represented by the formula (2-1a) was changed to the compound represented by the formula (2-2a).

Comparative Example 5

A nonaqueous electrolyte solution was prepared in the same manner as in Comparative Example 3, except that the compound represented by the formula (2-1a) was changed to the compound represented by the formula (2-3a).

Comparative Example 6

A nonaqueous electrolyte solution was prepared in the same manner as in Comparative Example 3, except that the compound represented by the formula (2-1a) was changed to the compound represented by the formula (2-4a).

Comparative Example 7

A nonaqueous electrolyte solution was prepared in the same manner as in Example 1, except that the compound represented by the formula (1-1) was changed to the compound represented by the formula (2-3a).

Comparative Example 8

A nonaqueous electrolyte solution was prepared in the same manner as in Example 1, except that the compound represented by the formula (1-1) was changed to sulfolane (SN).

Comparative Example 9

A nonaqueous electrolyte solution was prepared in the same manner as in Comparative Example 7, except that the compound represented by the formula (2-1a) was changed to the compound represented by the formula (2-2a).

Comparative Example 10

A nonaqueous electrolyte solution was prepared in the same manner as in Comparative Example 8, except that the compound represented by the formula (2-1a) was changed to the compound represented by the formula (2-2a).

Comparative Example 11

A nonaqueous electrolyte solution was prepared in the same manner as in Comparative Example 7, except that the compound represented by the formula (2-1a) was changed to the compound represented by the formula (2-4a).

Comparative Example 12

A nonaqueous electrolyte solution was prepared in the same manner as in Comparative Example 8, except that the compound represented by the formula (2-1a) was changed to the compound represented by the formula (2-4a).

2. Evaluation

Fabrication of Nonaqueous Electrolyte Solution Secondary Battery $LiNi_{1/3}Co_{1/3}Mn_{1/3}O_2$ as a positive electrode active material and carbon black as an electrical conductivity-imparting agent were dry-mixed. The obtained mixture was uniformly dispersed in N-methyl-2-pyrrolidone (NMP) in which polyvinylidene difluoride (PVDF) as a binder had been dissolved, thereby preparing a slurry. The obtained slurry was applied to both surfaces of an aluminum metal foil (rectangular, a thickness of 20 μm). The coating film was dried to remove NMP, and the whole film was pressed to obtain a positive electrode sheet having the aluminum metal foil as a positive electrode collector and positive electrode active material layers formed on both surfaces of the foil. The ratio of the solid contents in the obtained positive electrode sheet was set to positive electrode active material:electrical conductivity-imparting agent:PVDF=92:5:3 in terms of a mass ratio.

Graphite powder as a negative electrode active material, a styrene-butadiene rubber (SBR) as a binder, and carboxymethyl cellulose (CMC) as a thickener were uniformly dispersed in water, thereby preparing a slurry. The obtained slurry was applied to one surface of a copper foil (rectangular, a thickness of 10 μm). The coating film was dried to remove water, and the whole film was pressed to obtain a negative electrode sheet having the copper foil as a negative electrode collector and a negative electrode active material layer formed on one surface of the foil, in which the ratio of the solid contents in the negative electrode sheet was set to negative electrode active material:CMC:SBR=98:1:1 in terms of a mass ratio.

With the fabricated positive electrode sheet and the negative electrode sheet, the negative electrode sheet, a separator formed of polyethylene, the positive electrode sheet, a separator formed of polyethylene, and the negative electrode sheet were laminated in this order to fabricate a battery element. This battery element was put in a bag formed of a laminated film having aluminum (thickness: 40 μm) and resin layers coating both sides thereof in such a way that the terminals of the positive electrode sheet and the negative electrode sheet protruded from the bag. Subsequently, each of the nonaqueous electrolyte solutions obtained in Examples and Comparative Examples was poured into the bag. The bag was vacuum-sealed to obtain a sheet-shaped nonaqueous electrolyte solution battery. Further, in order to increase the adhesiveness between the electrodes, the sheet-shaped nonaqueous electrolyte solution secondary battery was sandwiched between glass plates and pressurized.

Each of the obtained nonaqueous electrolyte solution secondary batteries was charged to 4.2 V at a current corresponding to 0.2 C at 25° C., and then aged at 45° C. for 24 hours. Thereafter, the nonaqueous electrolyte solution secondary battery was discharged to 3 V at a current corresponding to 0.2 C at 25° C. Subsequently, the nonaqueous electrolyte solution secondary battery was subjected to repetition of three cycles of an operation of charging to 4.2 V at a current corresponding to 0.2 C and discharging to 3 V at a current corresponding to 0.2 C, thereby stabilizing the battery. Thereafter, an initial charge/discharge in which charge/discharge is performed at a current corresponding to 1 C was performed, at which a discharge capacity was measured. The obtained value was defined as an "initial capacity". In addition, with regard to the nonaqueous electrolyte solution secondary battery that had been charged to a capacity of 50% out of the initial capacity after the initial charge/discharge, an AC impedance at 25° C. was measured and the obtained value was defined as an "initial resistance (Ω)".

Measurement of Discharge Capacity Retention Rate and Resistance Increase Rate

With regard to each of the nonaqueous electrolyte solution secondary batteries after the initial charge/discharge, 200 cycles of charge/discharge cycle tests were carried out at a charge rate of 1 C, a discharge rate of 1 C, a charge cut-off voltage of 4.2 V, and a discharge cut-off voltage of 3 V. Thereafter, charge/discharge was performed at a current corresponding to 1 C, at which a discharge capacity was measured, and the obtained value was defined as a "capacity after cycles". In addition, with regard to the nonaqueous electrolyte solution secondary battery that had been charged to a capacity out of 50% of the capacity after cycles after the cycle test, an AC impedance in an environment of 25° C. was measured and the obtained value was defined as a "resistance (Ω) after cycles". The discharge capacity retention rate and the resistance increase rate in each of the batteries are shown in Tables 2, 3, and 4. "Discharge capacity retention rate" is calculated by an equation of (capacity after cycles)/(initial capacity), and "Resistance increase rate" is calculated by an equation of (resistance after cycles)/(initial resistance).

Measurement of Amount of Gas Generated

Apart from the batteries used for evaluation of the initial resistance, and evaluation of the discharge capacity retention rate and the resistance increase rate, a nonaqueous electrolyte solution secondary battery having the same configuration including each of the electrolyte solutions of Examples and Comparative Examples was prepared. This nonaqueous electrolyte solution secondary battery was charged to 4.2 V at a current corresponding to 0.2 C at 25° C. and then aged by maintaining the battery at 45° C. for 24 hours. Thereafter, the nonaqueous electrolyte solution secondary battery was discharged to 3 V at a current corresponding to 0.2 C at 25° C. Subsequently, the nonaqueous electrolyte solution secondary battery was subjected to repetition of three cycles of an operation of charging to 4.2 V at a current corresponding to 0.2 C and discharging to 3 V at a current corresponding to 0.2 C, thereby stabilizing the battery. With regard to the nonaqueous electrolyte solution secondary battery after the initial charge/discharge, the volume of the battery was measured by an Archimedes' method and was defined as an "initial volume ($cm^3$) of the battery". In addition, the nonaqueous electrolyte solution secondary battery after the initial charge/discharge was charged to 4.2 V at 1 C at 25° C., and then kept at 60° C. for 168 hours. Thereafter, the nonaqueous electrolyte solution secondary battery was cooled to 25° C. and discharged to 3 V at 1 C. Thereafter, with regard to the nonaqueous electrolyte solution secondary battery, the volume of the battery was measured by the Archimedes' method and the obtained value was defined as a "volume ($cm^3$) of the battery after storage at a high temperature". The amount of gas generated in each of the batteries is shown in Tables 2, 3, and 4. "Amount of gas generated" is a value calculated by an equation: (volume after storage at high temperature)−(initial volume).

TABLE 2

| | First compound | | Second compound | | | Discharge capacity | | Amount (cm³) |
|---|---|---|---|---|---|---|---|---|
| | Type | Cont. (% by mass) | Type | Cont. (% by mass) | Positive electrode active material | retention rate (%) | Resistance increase rate | of gas generated |
| Ex. 1 | (1-1) | 1.0 | (2-1a) | 1.0 | $LiNi_{1/3}Co_{1/3}Mn_{1/3}O_2$ | 94 | 1.2 | 0.06 |
| Ex. 2 | (1-1) | 2.0 | (2-1a) | 1.0 | | 95 | 1.1 | 0.08 |
| Ex. 3 | (1-1) | 1.0 | (2-1a) | 2.0 | | 95 | 1.1 | 0.12 |
| Ex. 4 | (1-1) | 1.0 | (2-1b) | 1.0 | | 92 | 1.2 | 0.11 |
| Ex. 5 | (1-6) | 1.0 | (2-1a) | 1.0 | | 92 | 1.2 | 0.10 |
| Ex. 6 | (1-10) | 1.0 | (2-1a) | 1.0 | | 93 | 1.2 | 0.07 |
| Ex. 7 | (1-1) | 1.0 | (2-2a) | 1.0 | | 95 | 1.2 | 0.09 |
| Ex. 8 | (1-1) | 2.0 | (2-2a) | 1.0 | | 96 | 1.1 | 0.09 |
| Ex. 9 | (1-6) | 1.0 | (2-2a) | 1.0 | | 94 | 1.3 | 0.10 |
| Ex. 10 | (1-6) | 1.0 | (2-2a) | 2.0 | | 96 | 1.1 | 0.07 |
| Ex. 11 | (1-10) | 1.0 | (2-2a) | 1.0 | | 93 | 1.2 | 0.12 |
| Ex. 12 | (1-1) | 1.0 | (2-3a) | 1.0 | | 92 | 1.2 | 0.10 |
| Ex. 13 | (1-1) | 2.0 | (2-3a) | 1.0 | | 93 | 1.1 | 0.07 |
| Ex. 14 | (1-1) | 1.0 | (2-3a) | 2.0 | | 92 | 1.1 | 0.07 |
| Ex. 15 | (1-6) | 1.0 | (2-3a) | 1.0 | | 92 | 1.2 | 0.09 |
| Ex. 16 | (1-10) | 1.0 | (2-3a) | 1.0 | | 92 | 1.1 | 0.08 |
| Ex. 17 | (1-1) | 1.0 | (2-4a) | 1.0 | | 92 | 1.2 | 0.08 |
| Ex. 18 | (1-1) | 2.0 | (2-4a) | 1.0 | | 93 | 1.2 | 0.10 |
| Ex. 19 | (1-6) | 1.0 | (2-4a) | 1.0 | | 94 | 1.0 | 0.07 |
| Ex. 20 | (1-6) | 1.0 | (2-4a) | 1.5 | | 94 | 1.1 | 0.06 |
| Ex. 21 | (1-10) | 1.0 | (2-4a) | 1.0 | | 93 | 1.1 | 0.09 |

TABLE 3

| | First compound | | Second compound | | | Discharge capacity | | Amount (cm³) |
|---|---|---|---|---|---|---|---|---|
| | Type | Cont. (% by mass) | Type | Cont. (% by mass) | Positive electrode active material | retention rate (%) | Resistance increase rate | of gas generated |
| Comp. Ex. 1 | — | — | — | — | $LiNi_{1/3}Co_{1/3}Mn_{1/3}O_2$ | 85 | 1.6 | 0.40 |
| Comp. Ex. 2 | (1-1) | 1.0 | — | — | | 90 | 1.3 | 0.11 |
| Comp. Ex. 3 | — | — | (2-1a) | 1.0 | | 86 | 1.5 | 0.45 |
| Comp. Ex. 4 | — | — | (2-2a) | 1.0 | | 88 | 1.4 | 0.39 |
| Comp. Ex. 5 | — | — | (2-3a) | 1.0 | | 86 | 1.3 | 0.20 |
| Comp. Ex. 6 | — | — | (2-4a) | 1.0 | | 91 | 1.2 | 0.25 |

TABLE 4

| | Second compound | | Second compound | | Others | | | Discharge capacity | | Amount (cm³) |
|---|---|---|---|---|---|---|---|---|---|---|
| | Type | Cont. (% by mass) | Type | Cont. (% by mass) | Type | Cont. (% by mass) | Positive electrode active material | retention rate (%) | Resistance increase rate | of gas generated |
| Comp. Ex. 7 | (2-3a) | 1.0 | (2-1a) | 1.0 | — | — | $LiNi_{1/3}Co_{1/3}Mn_{1/3}O_2$ | 86 | 1.3 | 0.38 |
| Comp. Ex. 8 | — | — | (2-1a) | 1.0 | SN | 1.0 | | 86 | 1.4 | 0.55 |
| Comp. Ex. 9 | (2-3a) | 1.0 | (2-2a) | 1.0 | — | — | | 87 | 1.3 | 0.38 |
| Comp. Ex. 10 | — | — | (2-2a) | 1.0 | SN | 1.0 | | 88 | 1.3 | 0.44 |
| Comp. Ex. 11 | (2-3a) | 1.0 | (2-4a) | 1.0 | — | — | | 91 | 1.2 | 0.22 |

TABLE 4-continued

| | Second compound | | Others | | | Discharge capacity | | Amount (cm³) |
| | Type | Cont. (% by mass) | Type | Cont. (% by mass) | Type | Cont. (% by mass) | Positive electrode active material | retention rate (%) | Resistance increase rate | of gas generated |
|---|---|---|---|---|---|---|---|---|---|---|
| Comp. Ex. 12 | — | — | (2-4a) | 1.0 | SN | 1.0 | | 90 | 1.2 | 0.54 |

4. Effect of Positive Electrode Active Material

With regard to the nonaqueous electrolyte solutions in some of Examples and Comparative Examples, the positive electrode active material was changed to $LiNi_{0.8}Co_{0.1}Mn_{0.1}O_2$, and the nonaqueous electrolyte solution secondary battery was fabricated and evaluated in the same manner as above. The results are shown in Tables 5 and 6.

TABLE 5

| | First compound | | Second compound | | | Discharge capacity | | Amount (cm³) |
| | Type | Cont. (% by mass) | Type | Cont. (% by mass) | Positive electrode active material | retention rate (%) | Resistance increase rate | of gas generated |
|---|---|---|---|---|---|---|---|---|
| Ex. 1 | (1-1) | 1.0 | (2-1a) | 1.0 | $LiNi_{0.8}Co_{0.1}Mn_{0.1}O_2$ | 90 | 1.5 | 0.8 |
| Ex. 5 | (1-6) | 1.0 | (2-1a) | 1.0 | | 92 | 1.5 | 0.6 |
| Ex. 9 | (1-6) | 1.0 | (2-2a) | 1.0 | | 94 | 1.4 | 0.4 |
| Ex. 15 | (1-6) | 1.0 | (2-3a) | 1.0 | | 90 | 1.5 | 0.5 |
| Ex. 19 | (1-6) | 1.0 | (2-4a) | 1.0 | | 94 | 1.3 | 0.3 |
| Ex. 11 | (1-10) | 1.0 | (2-2a) | 1.0 | | 93 | 1.3 | 0.4 |
| Ex. 16 | (1-10) | 1.0 | (2-3a) | 1.0 | | 91 | 1.4 | 0.5 |
| Ex. 21 | (1-10) | 1.0 | (2-4a) | 1.0 | | 95 | 1.3 | 0.4 |
| Comp. Ex. 1 | — | — | — | — | | 80 | 2.5 | 2.2 |
| Comp. Ex. 2 | (1-1) | 1.0 | — | — | | 86 | 1.7 | 1.0 |
| Comp. Ex. 3 | — | — | (2-1a) | 1.0 | | 82 | 2.3 | 2.4 |
| Comp. Ex. 4 | — | — | (2-2a) | 1.0 | | 84 | 2.2 | 2.2 |
| Comp. Ex. 5 | — | — | (2-3a) | 1.0 | | 81 | 2.0 | 1.6 |
| Comp. Ex. 6 | — | — | (2-4a) | 1.0 | | 83 | 1.7 | 1.3 |

TABLE 6

| | Second compound | | | | Others | | Discharge capacity | | Amount (cm³) |
| | Type | Cont. (% by mass) | Type | Cont. (% by mass) | Type | Cont. (% by mass) | Positive electrode active material | retention rate (%) | Resistance increase rate | of gas generated |
|---|---|---|---|---|---|---|---|---|---|---|
| Comp. Ex. 7 | (2-3a) | 1.0 | (2-1a) | 1.0 | — | — | $LiNi_{0.8}Co_{0.1}Mn_{0.1}O_2$ | 82 | 2.1 | 2.2 |
| Comp. Ex. 8 | — | — | (2-1a) | 1.0 | SN | 1.0 | | 82 | 2.2 | 2.8 |
| Comp. Ex. 9 | (2-3a) | 1.0 | (2-2a) | 1.0 | — | — | | 83 | 2.1 | 2.1 |
| Comp. Ex. 10 | — | — | (2-2a) | 1.0 | SN | 1.0 | | 84 | 2.1 | 2.4 |
| Comp. Ex. 11 | (2-3a) | 1.0 | (2-4a) | 1.0 | — | — | | 83 | 1.7 | 1.1 |
| Comp. Ex. 12 | — | — | (2-4a) | 1.0 | SN | 1.0 | | 82 | 1.7 | 1.4 |

From these experiment results, it was confirmed that an electricity storage device having a long lifespan and suppressed gas generation is obtained by combination of the first compound and the second compound.

REFERENCE SIGNS LIST

1: Electricity storage device (nonaqueous electrolyte solution secondary battery), 2: Positive electrode collector, 3: Positive electrode active material layer, 4: Positive electrode plate, 5: Negative electrode collector, 6: Negative electrode active material layer, 7: Negative electrode plate, 8: Nonaqueous electrolyte solution, and 9: Separator.

The invention claimed is:

1. An additive for nonaqueous electrolyte solutions, comprising:
    a first compound represented by the following formula (1); and
    at least one second compound selected from the group consisting of a compound represented by the following formula (2-1), a compound represented by the following formula (2-2), a compound represented by the following formula (2-3), and a compound represented by the following formula (2-4),

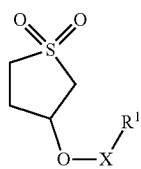

(1)

in the formula (1), X represents a sulfonyl group or a carbonyl group, wherein when X is a sulfonyl group, $R^1$ represents an optionally substituted alkyl group having 1 to 4 carbon atoms, an optionally substituted alkenyl group having 2 to 4 carbon atoms, an optionally substituted alkynyl group having 2 to 4 carbon atoms, an optionally substituted aryl group, an optionally substituted alkoxy group having 1 to 4 carbon atoms, an optionally substituted alkenyloxy group having 2 to 4 carbon atoms, an optionally substituted alkynyloxy group having 2 to 4 carbon atoms, or an optionally substituted aryloxy group, wherein when $R^1$ is substituted, a substituent in $R^1$ is selected from the group consisting of: a halogen atom, an aryl group, a halogenated aryl group, an alkoxy group, a halogenated alkoxy group, or a combination thereof, and when X is a carbonyl group, $R^1$ represents a methyl group, a substituted alkyl group having 1 to 4 carbon atoms, or a substituted aryl group, wherein a substituent in $R^1$ is a fluorine atom;

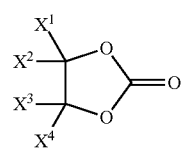

(2-1)

wherein when X in the formula (1) is a sulfonyl group, in the formula (2-1), $X^1$, $X^2$, $X^3$, and $X^4$ each independently represent a hydrogen atom, a fluorine atom, a chlorine atom, a vinyl group, an allyl group, or an alkyl group having 1 to 3 carbon atoms and optionally substituted with a halogen atom and when X in the formula (1) is a carbonyl group, $X^1$, $X^2$, $X^3$, and $X^4$ in the formula (2-1) each independently represent a hydrogen atom or a fluorine atom,

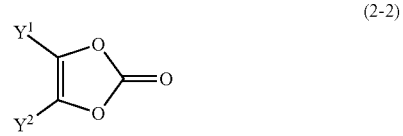

(2-2)

wherein when X in the formula (1) is a sulfonyl group, in the formula (2-2), $Y^1$ and $Y^2$ each independently represent a hydrogen atom, a fluorine atom, a chlorine atom, or an alkyl group having 1 to 3 carbon atoms and optionally substituted with a halogen atom and when X in the formula (1) is a carbonyl group, $Y^1$ and $Y^2$ in the formula 2-2 each independently represent a hydrogen atom or a fluorine atom,

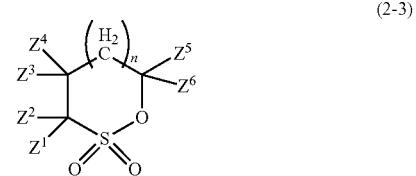

(2-3)

wherein when X in the formula (1) is a sulfonyl group, in the formula (2-3), $Z^1$, $Z^2$, $Z^3$, $Z^4$, $Z^5$, and $Z^6$ each independently represent a hydrogen atom, a fluorine atom, a chlorine atom, or an alkyl group having 1 to 3 carbon atoms and optionally substituted with a halogen atom, and n represents 0 or 1 and when X in the formula (1) is a carbonyl group, $Z^1$, $Z^2$, $Z^3$, $Z^4$, $Z^5$, and $Z^6$ each independently represent a hydrogen atom or a fluorine atom, and n represents 0 or 1,

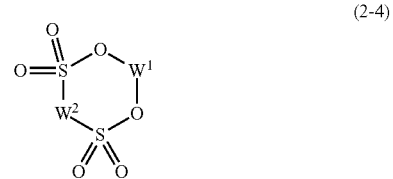

(2-4)

wherein when X in the formula (1) is a sulfonyl group, in the formula (2-4), $W^1$ and $W^2$ each independently represent an optionally branched, and substituted or unsubstituted alkylene group having 1 to 3 carbon atoms, an optionally branched, and substituted or unsubstituted perfluoroalkylene group having 1 to 3 carbon atoms, or an optionally branched, and substituted or unsubstituted fluoroalkylene group having 1 to 3 carbon atoms and when X in the formula (1) is a carbonyl group, $W^1$ and $W^2$ each independently represent an optionally branched, unsubstituted allylene group having 1 to 3 carbon atoms, an optionally branched, unsubstituted perfluoroalkylene group having 1 to 3 carbon atoms, or an optionally branched, unsubstituted fluoroalkylene group having 1 to 3 carbon atoms, wherein when X is a carbonyl group, a mass ratio of the first compound to the second compound is in a range from 1:0.25 to 1:2.

2. The additive for nonaqueous electrolyte solutions according to claim 1, wherein when X in the formula 1 is a sulfonyl group, $R^1$ in the formula (1) is an alkyl group having 1 to 3 carbon atoms and optionally substituted with a halogen atom, an aryl group or a halogenated aryl group, an alkenyl group having 2 to 4 carbon atoms and optionally substituted with a halogen atom, an alkynyl group having 2 to 4 carbon atoms and optionally substituted with a halogen atom, or an aryl group optionally substituted with a halogen atom, an alkyl group or a halogenated alkyl group.

3. The additive for nonaqueous electrolyte solutions according to claim 1, wherein when X in the formula 1 is a sulfonyl group, in the formula (2-1), $X^1$, $X^2$, $X^3$, and $X^4$ are each independently a hydrogen atom or a fluorine atom, in the formula (2-2), $Y^1$ and $Y^2$ are each independently a hydrogen atom or a methyl group, in the formula (2-3), n is 0 and $Z^1$, $Z^2$, $Z^3$, $Z^4$, $Z^5$, and $Z^6$ are each independently a hydrogen atom or a methyl group, and in the formula (2-4), $W^1$ and $W^2$ are each independently an alkylene group having 1 or 2 carbon atoms, a perfluoroalkylene group having 1 or 2 carbon atoms, or a fluoroalkylene group having 1 or 2 carbon atoms.

4. A nonaqueous electrolyte solution comprising:
a first compound represented by the formula (1);
at least one second compound selected from the group consisting of a compound represented by the following formula (2-1), a compound represented by the following formula (2-2), a compound represented by the following formula (2-3), and a compound represented by the following formula (2-4); and
an electrolyte,

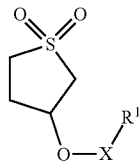
(1)

in the formula (1), X represents a sulfonyl group or a carbonyl group, wherein when X is a sulfonyl group, $R^1$ represents an optionally substituted alkyl group having 1 to 4 carbon atoms, an optionally substituted alkenyl group having 2 to 4 carbon atoms, an optionally substituted alkynyl group having 2 to 4 carbon atoms, an optionally substituted aryl group, an optionally substituted alkoxy group having 1 to 4 carbon atoms, an optionally substituted alkenyloxy group having 2 to 4 carbon atoms, an optionally substituted alkynyloxy group having 2 to 4 carbon atoms, or an optionally substituted aryloxy group, wherein when $R^1$ is substituted, a substituent in $R^1$ is selected from the group consisting of: a halogen atom, an aryl group, a halogenated aryl group, an alkoxy group, a halogenated alkoxy group, or a combination thereof, and when X is a carbonyl group, $R^1$ represents a methyl group, a substituted alkyl group having 1 to 4 carbon atoms, or a substituted aryl group, wherein a substituent in $R^1$ is a fluorine atom;

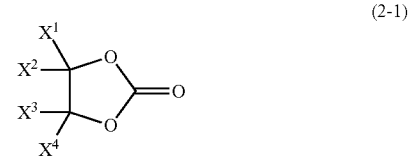
(2-1)

wherein when X in the formula (1) is a sulfonyl group, in the formula (2-1), $X^1$, $X^2$, $X^3$ and $X^4$ each independently represent a hydrogen atom, a fluorine atom, a chlorine atom, a vinyl group, an allyl group, or an alkyl group having 1 to 3 carbon atoms and optionally be substituted with a halogen atom and when X in the formula (1) is a carbonyl group, $X^1$, $X^2$, $X^3$, and $X^4$ in the formula (2-1) each independently represent a hydrogen atom or a fluorine atom,

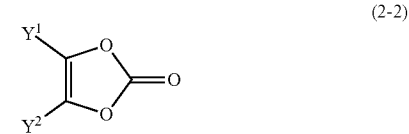
(2-2)

wherein when X in the formula (1) is a sulfonyl group, in the formula (2-2), $Y^1$ and $Y^2$ each independently represent a hydrogen atom, a fluorine atom, a chlorine atom, or an alkyl group having 1 to 3 carbon atoms and optionally substituted with a halogen atom and when X in the formula (1) is a carbonyl group, $Y^1$ and $Y^2$ in the formula 2-2 each independently represent a hydrogen atom or a fluorine atom,

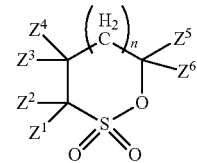
(2-3)

wherein when X in the formula (1) is a sulfonyl group, in the formula (2-3), $Z^1$, $Z^2$, $Z^3$, $Z^4$, $Z^5$, and $Z^6$ each independently represent a hydrogen atom, a fluorine atom, a chlorine atom, or an alkyl group having 1 to 3 carbon atoms and optionally substituted with a halogen atom, and n represents 0 or 1 and when X in the formula (1) is a carbonyl group, $Z^1$, $Z^2$, $Z^3$, $Z^4$, $Z^5$, and $Z^6$ each independently represent a hydrogen atom or a fluorine atom, and n represents 0 or 1,

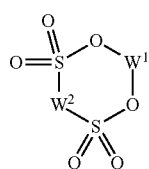 (2-4)

wherein when X in the formula (1) is a sulfonyl group, in the formula (2-4), $W^1$ and $W^2$ each independently represent an optionally branched, and substituted or unsubstituted alkylene group having 1 to 3 carbon atoms, an optionally branched, and substituted or unsubstituted perfluoroalkylene group having 1 to 3 carbon atoms, or an optionally branched, and substituted or unsubstituted fluoroalkylene group having 1 to 3 carbon atoms and when X in the formula (1) is a carbonyl group, $W^1$ and $W^2$ each independently represent an optionally branched, unsubstituted allylene group having 1 to 3 carbon atoms, an optionally branched, unsubstituted perfluoroalkylene group having 1 to 3 carbon atoms, or an optionally branched, unsubstituted fluoroalkylene group having 1 to 3 carbon atoms, wherein when X is a carbonyl group, a mass ratio of the first compound to the second compound is in a range from 1:0.25 to 1:2.

5. The nonaqueous electrolyte solution according to claim 4, further comprising a nonaqueous solvent as a compound different from the first compound and the second compound, wherein the content of the first compound is 0.05% by mass to 5% by mass with respect to the total amount of the nonaqueous electrolyte solution, and each of the content of the compound represented by the formula (2-1), the content of the compound represented by the formula (2-2), the content of the compound represented by the formula (2-3), and the content of the compound represented by the formula (2-4) in a case where these compounds are each included in the nonaqueous electrolyte solution is 0.05% by mass to 5% by mass with respect to the total amount of the nonaqueous electrolyte solution.

6. The nonaqueous electrolyte solution according to claim 4, wherein the electrolyte includes a lithium salt.

7. An electricity storage device comprising:

the nonaqueous electrolyte solution according to claim 4;

a positive electrode including a positive electrode active material; and a negative electrode including a negative electrode active material.

8. The electricity storage device according to claim 7, wherein the positive electrode active material is a lithium-containing composite oxide represented by $Li_zNi_{(1-x-y)}Co_xM_yO_2$ in which x, y, and z are numerical values satisfying $0.01 \leq x \leq 0.20$, $0 \leq y \leq 0.20$, and $0.97 \leq z \leq 1.20$, and M represents at least one element selected from Mn, V, Mg, Mo, Nb, and Al.

9. The electricity storage device according to claim 7, wherein the positive electrode active material is a lithium-containing composite oxide represented by $Li_zCo_{(1-x)}M_xO_2$ in which x and z are numerical values satisfying $0 \leq x \leq 0.1$ and $0.97 \leq z \leq 1.20$, and M represents at least one element selected from Mn, Ni, V, Mg, Mo, Nb, and Al.

* * * * *